US011881618B2

(12) United States Patent
Pajona

(10) Patent No.: US 11,881,618 B2
(45) Date of Patent: Jan. 23, 2024

(54) ANTENNA SYSTEM WITH COUPLED REGION

(71) Applicant: Kyocera AVX Components (San Diego), Inc., San Diego, CA (US)

(72) Inventor: Olivier Pajona, Antibes (FR)

(73) Assignee: KYOCERA AVX COMPONENTS (SAN DIEGO), INC., San Diego, CA (US)

( * ) Notice: Subject to any disclaimer, the term of this patent is extended or adjusted under 35 U.S.C. 154(b) by 0 days.

(21) Appl. No.: 17/350,458

(22) Filed: Jun. 17, 2021

(65) Prior Publication Data

US 2022/0013896 A1 Jan. 13, 2022

Related U.S. Application Data

(60) Provisional application No. 63/050,340, filed on Jul. 10, 2020.

(51) Int. Cl.

| | |
|---|---|
| ***H01Q 1/48*** | (2006.01) |
| ***H01Q 1/52*** | (2006.01) |
| ***H01Q 9/04*** | (2006.01) |
| ***H01Q 9/42*** | (2006.01) |

(52) U.S. Cl.

CPC ................. *H01Q 1/48* (2013.01); *H01Q 1/52* (2013.01); *H01Q 9/0421* (2013.01); *H01Q 9/0457* (2013.01); *H01Q 9/42* (2013.01)

(58) Field of Classification Search

CPC .......... H01Q 1/48; H01Q 1/52; H01Q 9/0421; H01Q 9/0457; H01Q 9/42; H01Q 1/243

See application file for complete search history.

(56) References Cited

U.S. PATENT DOCUMENTS

| | | | | |
|---|---|---|---|---|
| 6,456,243 | B1 | 9/2002 | Poilasne et al. | |
| 6,717,551 | B1 | 4/2004 | Desclos et al. | |
| 6,744,410 | B2 | 6/2004 | Shamblin et al. | |
| 6,943,730 | B2 | 9/2005 | Poilasne et al. | |
| 7,663,556 | B2 | 2/2010 | Desclos et al. | |
| 7,696,932 | B2 | 4/2010 | Desclos et al. | |
| 2001/0011964 | A1* | 8/2001 | Sadler | H01Q 1/243 343/824 |
| 2003/0156065 | A1* | 8/2003 | Jo | H01Q 1/243 343/895 |
| 2004/0095280 | A1 | 5/2004 | Poilasne et al. | |
| 2011/0037663 | A1 | 2/2011 | Huang | |
| 2011/0122027 | A1 | 5/2011 | Wong et al. | |

(Continued)

FOREIGN PATENT DOCUMENTS

| | | |
|---|---|---|
| WO | WO03092118 | 11/2003 |
| WO | WO 2011/154955 | 12/2011 |

*Primary Examiner* — Hai V Tran
*Assistant Examiner* — Michael M Bouizza
(74) *Attorney, Agent, or Firm* — Dority & Manning. P.A.

(57) ABSTRACT

An antenna system can include an antenna radiating element configured for at least one of RF signal transmission or RF signal reception. The antenna radiating element can include a ground leg. The antenna radiating element can include a ground connection coupled to the ground leg and configured to couple the ground leg to ground. The ground connection can include one or more electromagnetically coupled regions. The one or more electromagnetically coupled regions can be configured to increase an electrical length of the ground connection relative to a conductor length of the ground connection.

18 Claims, 4 Drawing Sheets

(56) References Cited

U.S. PATENT DOCUMENTS

| | | | | |
|---|---|---|---|---|
| 2013/0113661 | A1 | 5/2013 | Chen et al. | |
| 2015/0119045 | A1* | 4/2015 | Montgomery | H01Q 9/42<br>455/562.1 |
| 2016/0043467 | A1* | 2/2016 | Desclos | H01Q 9/42<br>343/745 |
| 2016/0294048 | A1 | 10/2016 | Xu et al. | |

* cited by examiner

ANTENNA SYSTEM WITH COUPLED REGION

PRIORITY CLAIM

The present application claims the benefit of priority of U.S. Provisional App. No. 63/050,340, titled "Antenna System With Coupled Region," having a filing date of Jul. 10, 2021, which is incorporated by reference herein.

FIELD

Example aspects of the present disclosure relate generally to the field of antenna systems, such as, for example, passive antenna systems.

BACKGROUND

Antenna systems can propagate and/or receive electromagnetic waves that are transmitted through the air and/or other materials from a source to a destination. Various material types can impact the manner in which electromagnetic waves are propagated.

SUMMARY

Aspects and advantages of embodiments of the present disclosure will be set forth in part in the following description, or can be learned from the description, or can be learned through practice of the embodiments.

One example aspect of the present disclosure is directed to an antenna system. The antenna system can include an antenna radiating element configured for at least one of RF signal transmission or RF signal reception. The antenna radiating element can include a ground leg. The antenna radiating element can include a ground connection coupled to the ground leg and configured to couple the ground leg to ground. The ground connection can include one or more electromagnetically coupled regions. The one or more electromagnetically coupled regions can be configured to increase an electrical length of the ground connection relative to a conductor length of the ground connection.

Another example aspect of the present disclosure is directed to a mobile device. The mobile device can include a display screen. The mobile device can include one or more processors. The mobile device can include telecommunication circuitry configured to provide telecommunications. The mobile device can include an antenna system. The antenna system can include an antenna radiating element configured for at least one of RF signal transmission or RF signal reception. The antenna radiating element can include a ground leg. The antenna radiating element can include a ground connection coupled to the ground leg and configured to couple the ground leg to ground. The ground connection can include one or more electromagnetically coupled regions. The one or more electromagnetically coupled regions can be configured to increase an electrical length of the ground connection relative to a conductor length of the ground connection.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
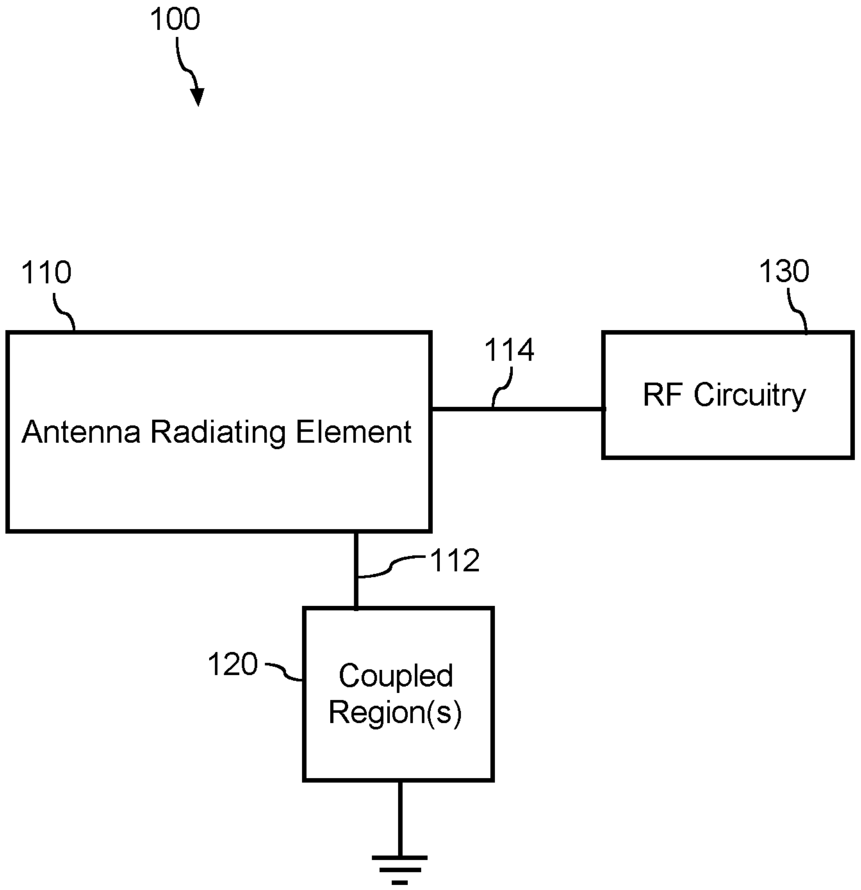
FIG. 1 illustrates an antenna system having a coupled region at a ground connection according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to an antenna system for radiofrequency (RF) communications. The antenna system can include an antenna radiating element. The antenna radiating element can be configured for RF signal transmission and/or RF signal reception. For instance, the antenna radiating element can be configured to perform RF communications. As one example, the antenna radiating element can be implemented in a mobile device, such as a cell phone, smart phone, tablet computer, laptop computer, pager, personal digital assistant, or any other suitable mobile device. The antenna radiating element can be configured to receive and/or transmit some or all wireless signals for operation of the mobile device, such as, for instance, cellular signals, Bluetooth signals, Wi-Fi signals, RFID signals, and/or any other suitable signals, and/or combination thereof. For instance, in some embodiments, the antenna radiating element can be coupled to RF circuitry. The RF circuitry can include various circuitry (e.g., modulators, control circuitry, signal processing, upsamplers and/or downsamplers, etc.) configured to provide a suitable RF signal to the antenna radiating element for transmission and/or prepare a received signal from the antenna radiating element from various downstream circuitry (e.g., a processor of a mobile device).

For many devices, especially mobile devices, spatial constraints can limit effectiveness of an antenna system used for RF communications. For instance, constraints can be imposed on volumes and/or shapes of spaces that may be occupied by antenna systems and/or related circuitry (e.g. RF circuitry, control circuitry, etc.) For instance, it may be preferable in some cases to employ a space-saving antenna system that achieves reduced performance as a consequence of improved spatial characteristics. As one example, an antenna system can be provided with a fixed electrical length between an antenna radiating element and ground to reduce spatial requirements associated with, for instance, circuitry for tuning the electrical length.

In some cases, such as for monopole and/or dipole antennas, etc., performance of the antenna system can be sensitive to the electrical length of the ground connection. As one example, for monopole antenna systems, it can be desirable for the electrical length of the ground connection to be equivalent to about one quarter of a radiating wavelength at which the antenna radiating element radiates RF signals. One approach to providing this electrical length can be to include physical conductor length (e.g., tracing, wiring, etc.) equivalent to the electrical length. Another approach can include providing electrical components, such as capacitors, inductors, etc. that can provide the electrical length. While both these approaches can be useful, in some cases, they can undesirably contribute to spatial requirements of the antenna system. Additionally and/or alternatively, in some cases, the use of high dielectric material at the ground connection (e.g. to increase an electrical length of the ground connection) can undesirably reduce an overall frequency bandwidth of an antenna system. Thus, in some cases, it can be desirable for increased electrical length and/or reduced spatial requirements associated with a ground connection in addition to and/or alternatively to maintaining a frequency bandwidth of an antenna while providing increased electrical length.

Thus, example aspects of the present disclosure can be directed to an antenna system that can have a ground connection with increased electrical length compared to some existing configurations while occupying a similar and/or smaller footprint. As one example, the antenna system can be a planar antenna system. For example, the antenna system (e.g., an antenna radiating element, ground connection, etc.) can be disposed on a planar substrate. As another example, the antenna system can be a three-dimensional antenna system (e.g., including components spaced apart from a ground plane).

The antenna system can include an antenna radiating element. The antenna radiating element can be or can include any suitable antenna radiating element configured to form and/or operate within any suitable antenna system. For instance, the antenna radiating element can be or can include a planar antenna, such as a planar inverted F antenna, patch antenna, etc. As another example, the antenna radiating element can be or can include a monopole antenna. As another example, the antenna radiating element can be or can include a dipole antenna, such as an isolated magnetic dipole antenna. As one example, the antenna radiating element can be formed of one or more planar regions disposed in a bent orientation to form the antenna radiating element. As another example, the antenna radiating element can be disposed in an integrated circuit. As another example, the antenna radiating element can be formed of traces and/or wiring on a substrate, such as a planar substrate.

The antenna radiating element can be configured for RF signal transmission and/or RF signal reception. For instance, the antenna radiating element can be configured to perform RF communications. As one example, the antenna radiating element can be implemented in a mobile device, such as a cell phone, smart phone, tablet computer, laptop computer, pager, personal digital assistant, or any other suitable mobile device. For instance, the mobile device can include a screen configured to display information to a user and/or receive input from the user. As another example, the mobile device can include one or more processors (e.g., baseband processors) configured to perform computations associated with operation of the mobile device. As another example, the mobile device can include telecommunication circuitry (e.g., RF circuitry) configured to provide telecommunications, such as voice communications (e.g., telephone services) and/or other communications (e.g., textual communications, such as SMS).

As one example, an antenna system (e.g., including the antenna radiating element) can be disposed at least partially on a substrate, such as a planar substrate. The substrate can be configured for integration into a mobile device. For example, the substrate can include a connector that is coupled to the antenna radiating element and/or various other components of the antenna system. The connector can be configured to couple with a transmission line (e.g., a coaxial cable) to provide signals (e.g., RF signals) to and/or from the mobile device, such as from the one or more processors, telecommunication circuitry, etc.

The antenna radiating element can be configured to receive and/or transmit some or all wireless (e.g., radiofrequency) signals for operation of the mobile device, such as, for instance, cellular signals, Bluetooth signals, Wi-Fi signals, RFID signals, and/or any other suitable signals, and/or combination thereof. For instance, in some embodiments, the antenna radiating element can be coupled to RF circuitry. The RF circuitry can include various components (e.g., a front-end module, modulators, etc.) configured to provide RF signals to and/or from the antenna radiating element, such as to enable telecommunication and/or other functions of a mobile device.

As one example, the antenna radiating element can include a feed leg configured to couple the antenna radiating element to the RF circuitry. As one example, the feed leg can couple (e.g., by a feed connection on a substrate) the antenna radiating element to a transmission line, such as a portion of a transmission line configured to transmit RF signals. For example, in some embodiments, the feed leg can couple the antenna radiating element to an inner conductor (e.g., a signal line) of a coaxial cable (e.g., via the connector). The RF circuitry can include various circuitry (e.g., modulators, control circuitry, signal processing, upsamplers and/or downsamplers, etc.) configured to provide a suitable RF signal to the antenna radiating element for transmission and/or prepare a received signal from the antenna radiating element from various downstream circuitry (e.g., a processor of a mobile device).

According to example aspects of the present disclosure, an antenna radiating element can include a ground leg. A ground connection can be configured to couple the ground leg and/or antenna radiating element to ground. For instance, the ground leg can be coupled to the ground connection and/or include the ground connection. For instance, the ground connection can couple the ground leg and/or antenna radiating element to a transmission line, such as a grounded portion of the transmission line. As one example, the ground connection can couple the antenna radiating element to an outer conductor (e.g., a ground layer) of a coaxial cable (e.g., via the connector). For instance, the feed leg and/or ground leg can connect the antenna radiating element to signals (e.g., RF signals) at the transmission line.

The ground connection can include one or more electromagnetically coupled region(s). For instance, the electromagnetically coupled region(s) can form at least a portion of the ground connection. As one example, the electromagnetically coupled region(s) can be or can include reactively coupled regions, such as one or more inductively-electromagnetically coupled regions and/or one or more capacitively electromagnetically coupled region(s). The electromagnetically coupled region(s) can be configured to provide an increased electrical length at the ground leg and/or of the ground connection. As one example, the electrical length can be increased to provide desirable radiation characteristics of the antenna radiating element without requiring additional components (e.g., capacitors, inductors, etc.) and/or increased physical length (e.g., traces, wires, etc.) at the ground connection.

According to example aspects of the present disclosure, conductive material forming the electromagnetically coupled region(s) (e.g., the capacitively electromagnetically coupled region(s), and/or the inductively electromagnetically coupled region(s)) can contribute to the increased electrical length achieved by the electromagnetically coupled region(s). For instance, the capacitively electromagnetically coupled regions and/or inductively electromagnetically coupled regions can contribute to the electrical length due to capacitance and/or inductance, respectively. Additionally and/or alternatively, in some cases, the electromagnetically coupled region(s) can provide efficiently spaced physical length compared to some existing systems. For instance, in some implementations, the electromagnetically coupled regions can be configured to increase an electrical length of the ground connection relative to a conductor length of the ground connection. For example, the conductor length of the ground connection can be a length of conductive material used to form the ground connection (e.g., from a first end to a second end). The electrical length of the ground connection can be greater than the conductor length due to the contributions from the electromagnetically coupled regions.

Additionally and/or alternatively, in some embodiments, the electromagnetically coupled regions can be configured to filter one or more frequencies at the antenna element. For instance, the electromagnetically coupled regions can be configured to filter signals and/or signal components at unwanted frequencies (e.g., outside of a communication band, noise, etc.) from RF signals at the antenna.

The ground connection and/or electromagnetically coupled region(s) can be formed of any suitable material and/or in any suitable configuration in accordance with example aspects of the present disclosure. As one example, the electromagnetically coupled region(s) can be formed of a sheet of conductive material, such as a two-dimensional sheet of conductive material. Additionally and/or alternatively, the electromagnetically coupled region(s) can be formed of wiring, traces, and/or other conductive material printed onto a substrate. For instance, the electromagnetically coupled region(s) can be formed of conductive material that is integrated into and/or formed on a substrate, such as a planar substrate. (e.g., as opposed to components such as, for example, capacitors, inductors, etc.). For instance, the electromagnetically coupled region(s) can be planar. As one example, the electromagnetically coupled region(s) may not extend past a surface of a substrate. For instance, the electromagnetically coupled region(s) can be formed entirely of traces on a substrate.

In some embodiments, the ground connection including electromagnetically coupled region(s) can form a structure resembling an antenna shape, such as including a first end portion and/or a second end portion (e.g., a feed portion and/or a ground portion). The ground leg of an antenna radiating element can be coupled to the first end portion. Additionally and/or alternatively, the second end portion can be coupled to ground. For instance, in this manner, the ground connection and/or electromagnetically coupled region(s) can be coupled to an antenna radiating element to provide an increased electrical length. In some embodiments, the ground connection can be balanced and/or unbalanced. For instance, the ground connection can form a structure resembling a balanced antenna and/or an unbalanced antenna.

As one example, the ground connection including electromagnetically coupled region(s) can be or can include an isolated magnetic dipole shape. For instance, the isolated magnetic dipole shape can include at least one capacitively coupled region and/or inductively coupled region. The isolated magnetic dipole shape can be reflective of an isolated magnetic dipole antenna, such as an antenna that produces an isolated magnetic dipole when energized. For instance, in some embodiments, the isolated magnetic dipole shape can include a spiral planar portion to form the isolated magnetic dipole.

According to example aspects of the present disclosure, the antenna radiating element can be configured to radiate at a radiating wavelength. For example, the radiating wavelength can be or can include one or more wavelengths at radiofrequency and/or any other suitable wavelengths. The ground connection including electromagnetically coupled region(s) can be configured to provide a desirable electrical length based on the radiating wavelength. For instance, in some embodiments, the electromagnetically coupled region (s) can provide an electrical length of one quarter of the radiating wavelength at the ground leg. For instance, an electrical length of one quarter of the radiating wavelength can be beneficial for some antenna systems, such as monopole antenna systems. For instance, in some embodiments, the electrical length can be configured to mitigate a detuning condition of the antenna system. For example, the detuning condition can be any suitable detuning condition, such as detuning caused by a user's head, hand, or other body part, clothing, accessories, proximity to building, or any other suitable detuning condition. As another example, the electrical length of the ground leg can be extended in reduced space, which can, in some cases, prevent additional spatial requirements associated with, for instance, matching circuitry, such as impedance matching circuitry.

Additionally and/or alternatively, in some embodiments, the antenna system can be or can include a three-dimensional antenna structure including a ground plane and an antenna radiating element that is spaced apart from the ground plane. For instance, in some embodiments, the antenna radiating element can be disposed substantially parallel (e.g., within about 10 degrees of parallel) to the ground plane. Additionally and/or alternatively, in some embodiments, at least a portion of the electromagnetically coupled region(s) can be disposed substantially parallel to the ground plane. Additionally and/or alternatively, in some embodiments, at least a portion of the electromagnetically coupled region(s) can be disposed substantially perpendicular (e.g., within about 10 degrees of perpendicular) to the ground plane. As one example, the antenna radiating element can be spaced apart in substantially parallel configuration to the ground plane and the ground leg and/or coupled region can perpendicularly extend between the antenna radiating element and the ground plane.

Antenna systems according to example aspects of the present disclosure can achieve a number of technical effects and benefits. As one example, antenna systems having a ground connection with one or more electromagnetically coupled regions can provide an increased electrical length at the ground connection for a consistent footprint. For instance, this increased electrical length can allow antenna systems to achieve a desirably long electrical length (e.g., a quarter of a radiating wavelength) at the ground connection, which can provide for improved radiation characteristics and/or communication performance (e.g., connection strength, signal loss, etc.). This can provide for incorporation of well performing antenna systems into devices that may have otherwise been unable to achieve a proper electrical length, resulting in reduced communication performance.

As another example, a footprint required for the antenna system (e.g., a ground connection) can be reduced while achieving identical or near identical performance. As one example, the reduced footprint requirements for electrical length achieved by the electromagnetically coupled regions at the ground connection can provide for smaller antenna systems (e.g., smaller ground connections) that can allow more components to be incorporated into a same-sized mobile device. Additionally and/or alternatively, the reduced footprint achieved by the electromagnetically coupled regions can contribute to a reduced weight and/or reduced manufacturing cost (e.g., material cost) of the antenna system. For instance, the reduced footprint achieved by the electromagnetically coupled regions can provide for the ground connection to be positioned on a smaller substrate that may be cheaper to produce and/or lighter. As another example, the ground connection can provide an increased electrical length without requiring bulky and/or relatively expensive components such as, for example, resistors, inductors, capacitors, etc.

Additionally and/or alternatively, providing electromagnetically coupled regions at the ground connection can increase an electrical length of the ground connection without reducing a frequency bandwidth of the antenna element. Additionally and/or alternatively, the electromagnetically coupled regions at the ground connection can provide for an increased electrical length over a larger frequency band and/or a plurality of distinct (e.g., different) frequency bands.

Referring now to the FIGS., example aspects of the present disclosure will be discussed in detail. One of ordinary skill in the art should understand that the example embodiments depicted in the FIGS. are for the purposes of illustration only, and that components depicted therein can be changed, modified, omitted, duplicated, or otherwise be changed in accordance with example aspects of the present disclosure.

FIG. 1 illustrates an antenna system 100 having a coupled region at a ground connection according to example embodiments of the present disclosure. For instance, antenna system 100 includes antenna radiating element 110. The antenna radiating element 110 can be or can include any suitable antenna radiating element 110 configured to form and/or operate within antenna system 110. For instance, the antenna radiating element 110 can be or can include a planar antenna, such as a planar inverted F antenna, patch antenna, etc. As another example, the antenna radiating element 110 can be or can include a monopole antenna. As another example, the antenna radiating element 110 can be or can include a dipole antenna, such as an isolated magnetic dipole antenna. As one example, the antenna radiating element 110 can be formed of one or more planar regions disposed in a bent orientation to form the antenna radiating element 110. As another example, the antenna radiating element 110 can be disposed in an integrated circuit. As another example, the antenna radiating element 110 can be formed of traces and/or wiring on a substrate, such as a planar substrate.

The antenna radiating element 110 can be configured for RF signal transmission and/or RF signal reception. For instance, the antenna radiating element 110 can be configured to perform RF communications. The antenna radiating element 110 can be configured to receive and/or transmit some or all wireless (e.g., radiofrequency) signals, such as, for instance, cellular signals, Bluetooth signals, Wi-Fi signals, RFID signals, and/or any other suitable signals, and/or combination thereof. For instance, in some embodiments, the antenna radiating element 110 can be coupled to RF circuitry 130. The RF circuitry 130 can include various components (e.g., a front-end module, modulators, etc.) configured to provide RF signals to and/or from the antenna radiating element 110, such as to enable telecommunication and/or other functions of a mobile device.

As one example, the antenna radiating element 110 can include a feed leg 114 configured to couple the antenna radiating element 110 to the RF circuitry 130. As one example, the feed leg 114 can couple the antenna radiating element 110 to a transmission line, such as a portion of a transmission line configured to transmit RF signals to and/or from RF circuitry 130 to antenna radiating element 110. For example, in some embodiments, the feed leg can couple the antenna radiating element 110 to an inner conductor (e.g., a signal line) of a coaxial cable (e.g., via the connector). The RF circuitry 130 can include various circuitry (e.g., modulators, control circuitry, signal processing, upsamplers and/or downsamplers, etc.) configured to provide a suitable RF signal to the antenna radiating element 110 for transmission and/or prepare a received signal from the antenna radiating element 110 from various downstream circuitry (e.g., a processor of a mobile device).

According to example aspects of the present disclosure, antenna radiating element 110 can include a ground leg 112. A ground connection can be configured to couple the ground leg 112 and/or antenna radiating element 110 to ground. For instance, the ground leg 112 can be coupled to the ground connection and/or include the ground connection. For instance, the ground connection can couple the ground leg 112 and/or antenna radiating element 110 to a transmission line, such as a grounded portion of the transmission line. As one example, the ground connection can couple the antenna radiating element 110 to an outer conductor (e.g., a ground layer) of a coaxial cable (e.g., via the connector). For instance, the feed leg and/or ground leg 112 can connect the antenna radiating element 110 to signals (e.g., RF signals) at the transmission line.

The ground connection can include one or more electromagnetically coupled region(s) 120. For instance, the electromagnetically coupled region(s) 120 can form at least a portion of the ground connection. As one example, the electromagnetically coupled region(s) 120 can include one or more inductively-electromagnetically coupled regions and/or one or more capacitively electromagnetically coupled region(s) 120. The electromagnetically coupled region(s) 120 can be configured to provide an increased electrical length of the ground leg 112 and/or ground connection. For instance, the electromagnetically coupled region(s) 120 can provide increased electrical length at the ground leg 112 relative to a ground connection with an identical spatial footprint and not including the electromagnetically coupled region(s) 120. As one example, the electrical length can be increased to provide desirable radiation characteristics of the antenna radiating element 110 without requiring additional components (e.g., capacitors, inductors, etc.) and/or increased physical length (e.g., traces, wires, etc.) at the ground leg 112.

According to example aspects of the present disclosure, conductive material forming the electromagnetically coupled region(s) 120 (e.g., the capacitively electromagnetically coupled region(s) 120, and/or the inductively electromagnetically coupled region(s) 120) can contribute to the increased electrical length achieved by the electromagnetically coupled region(s) 120. For instance, the capacitively electromagnetically coupled regions and/or inductively electromagnetically coupled regions can contribute to the electrical length due to capacitance and/or inductance, respectively. Additionally and/or alternatively, in some cases, the electromagnetically coupled region(s) 120 can provide efficiently spaced physical length compared to some existing systems.

The ground connection and/or electromagnetically coupled region(s) 120 can be formed of any suitable material and/or in any suitable configuration in accordance with example aspects of the present disclosure. As one example, the electromagnetically coupled region(s) 120 can be formed of a sheet of conductive material, such as a two-dimensional sheet of conductive material. Additionally and/or alternatively, the electromagnetically coupled region(s) 120 can be formed of wiring, traces, and/or other conductive material printed onto a substrate. For instance, the electromagnetically coupled region(s) 120 can be formed of conductive material that is integrated into and/or formed on a substrate, such as a planar substrate (e.g., as opposed to components such as, for example, capacitors, inductors, etc.).

In some embodiments, the ground connection including electromagnetically coupled region(s) 120 can form a structure resembling an antenna shape, such as including a first end portion and/or a second end portion. The ground leg 112 of an antenna radiating element 110 can be coupled to the first end portion. Additionally and/or alternatively, the second end portion can be coupled to ground. For instance, in this manner, the ground connection and/or electromagnetically coupled region(s) 120 can be coupled to an antenna radiating element 110 to provide an increased electrical length.

As one example, the ground connection including electromagnetically coupled region(s) 120 can be or can include an isolated magnetic dipole shape. For instance, the isolated magnetic dipole shape can include at least one capacitively coupled region and/or inductively coupled region. The isolated magnetic dipole shape can be reflective of an isolated magnetic dipole antenna, such as an antenna that produces an isolated magnetic dipole when energized. For instance, in some embodiments, the isolated magnetic dipole shape can include a spiral planar portion to form the isolated magnetic dipole.

According to example aspects of the present disclosure, the antenna radiating element 110 can be configured to radiate at a radiating wavelength. For example, the radiating wavelength can be or can include one or more wavelengths at radiofrequency and/or any other suitable wavelengths. The ground connection including electromagnetically coupled region(s) 120 can be configured to provide a desirable electrical length based on the radiating wavelength. For instance, in some embodiments, the electromagnetically coupled region(s) 120 can provide an electrical length of one quarter of the radiating wavelength at the ground leg 112. For instance, an electrical length of one quarter of the radiating wavelength can be beneficial for some antenna systems, such as monopole antenna systems. For instance, in some embodiments, the electrical length can be configured to mitigate a detuning condition of the antenna system. For example, the detuning condition can be any suitable detuning condition, such as detuning caused by a user's head, hand, or other body part, clothing, accessories, proximity to building, or any other suitable detuning condition. As another example, the electrical length of the ground leg 112 can be extended in reduced space, which can, in some cases, prevent additional spatial requirements associated with, for instance, matching circuitry, such as impedance matching circuitry.

Figure 2:
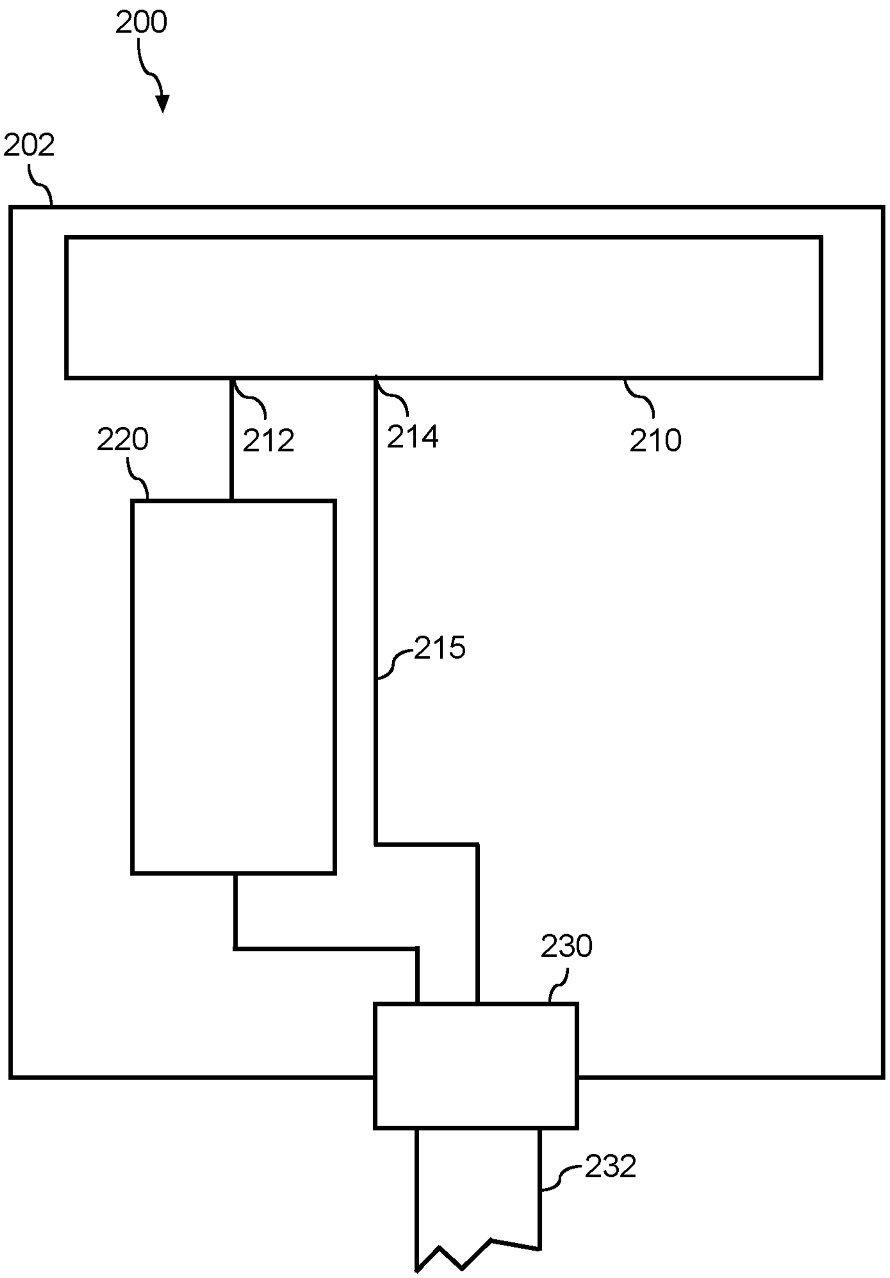
FIG. 2 illustrates an antenna system having a coupled region at a ground connection according to example embodiments of the present disclosure.

FIG. 2 illustrates an antenna system 200 having a coupled region at a ground connection according to example embodiments of the present disclosure. Antenna system 200 can be at least partially disposed on substrate 202. For instance, substrate 202 can be a planar substrate. Substrate 202 can be configured to house, for example, antenna radiating element 210, feed connection 215, ground connection 220, and/or connector 230, in addition to and/or alternatively to any other suitable components. Substrate 202 can be formed of any suitable material, such as non-conductive material. As one example, substrate 202 and/or portions thereof can be formed of plastic, fiberglass, flexible material (e.g., to form a flexible substrate, such as an FPCB), or any other suitable material, or combination thereof.

Antenna system 200 can include antenna radiating element 210. The antenna radiating element 210 can be or can include any suitable antenna radiating element 210 configured to form and/or operate within antenna system 210. For instance, the antenna radiating element 210 can be or can include a planar antenna, such as a planar inverted F antenna, patch antenna, etc. As another example, the antenna radiating element 210 can be or can include a monopole antenna. As another example, the antenna radiating element 210 can be or can include a dipole antenna, such as an isolated magnetic dipole antenna. As another example, the antenna radiating element 210 can be disposed in an integrated circuit. As another example, the antenna radiating element 210 can be formed of traces and/or wiring on substrate 202.

The antenna radiating element 210 can be configured for RF signal transmission and/or RF signal reception. For instance, the antenna radiating element 210 can be configured to perform RF communications. The antenna radiating element 210 can be configured to receive and/or transmit some or all wireless (e.g., radiofrequency) signals, such as, for instance, cellular signals, Bluetooth signals, Wi-Fi signals, RFID signals, and/or any other suitable signals, and/or combination thereof. For instance, in some embodiments, the antenna radiating element 210 can be coupled to RF circuitry by connector 230. The RF circuitry can include various components (e.g., a front-end module, modulators, etc.) configured to provide RF signals to and/or from the antenna radiating element 210, such as to enable telecommunication and/or other functions of a mobile device.

As one example, the antenna radiating element 210 can include a feed leg 214 configured to couple the antenna radiating element 210 to the RF circuitry. As one example, the feed leg 214 can couple the antenna radiating element 210 to transmission line 232, such as a portion of a transmission line 232 configured to transmit RF signals to and/or from RF circuitry to antenna radiating element 210. The RF circuitry can include various circuitry (e.g., modulators, control circuitry, signal processing, upsamplers and/or downsamplers, etc.) configured to provide a suitable RF signal to the antenna radiating element 210 for transmission and/or prepare a received signal from the antenna radiating element 210 from various downstream circuitry (e.g., a processor of a mobile device).

For example, in some embodiments, the feed leg can couple to a feed connection 215 printed on substrate 202. For instance, the feed connection 215 can couple the antenna radiating element 210 to connector 230. The connector 230 can couple the feed connection to transmission line 232, such as an inner conductor (e.g., a signal line) of a coaxial cable.

According to example aspects of the present disclosure, antenna radiating element 210 can include a ground leg 212. A ground connection 220 can be configured to couple the ground leg 212 and/or antenna radiating element 210 to ground. For instance, the ground leg 212 can be coupled to the ground connection 220 and/or include the ground connection 220. For instance, the ground connection 220 can couple the ground leg 212 and/or antenna radiating element 210 to transmission line 232, such as a grounded portion of the transmission line 232. As one example, the ground connection 220 can couple the antenna radiating element 210 to an outer conductor (e.g., a ground layer) of a coaxial cable (e.g., via the connector 230). For instance, the feed leg and/or ground leg 212 can connect the antenna radiating element 210 to signals (e.g., RF signals) at the transmission line 232.

The ground connection 220 can include one or more electromagnetically coupled region(s). For instance, the electromagnetically coupled region(s) can form at least a portion of the ground connection 220. As one example, the electromagnetically coupled region(s) can include one or more inductively-electromagnetically coupled regions and/or one or more capacitively electromagnetically coupled region(s). The electromagnetically coupled region(s) can be configured to provide an increased electrical length of the ground leg 212 and/or ground connection 220. For instance, the electromagnetically coupled region(s) can provide increased electrical length at the ground leg 212 relative to a ground connection 220 with an identical spatial footprint and not including the electromagnetically coupled region(s). As one example, the electrical length can be increased to provide desirable radiation characteristics of the antenna radiating element 210 without requiring additional components (e.g., capacitors, inductors, etc.) and/or increased physical length (e.g., traces, wires, etc.) at the ground leg 212.

According to example aspects of the present disclosure, conductive material forming the electromagnetically coupled region(s) (e.g., the capacitively electromagnetically coupled region(s), and/or the inductively electromagnetically coupled region(s)) can contribute to the increased electrical length achieved by the electromagnetically coupled region(s). For instance, the capacitively electromagnetically coupled regions and/or inductively electromagnetically coupled regions can contribute to the electrical length due to capacitance and/or inductance, respectively. Additionally and/or alternatively, in some cases, the electromagnetically coupled region(s) can provide efficiently spaced physical length compared to some existing systems.

The ground connection 220 and/or electromagnetically coupled region(s) can be formed of any suitable material and/or in any suitable configuration in accordance with example aspects of the present disclosure. As one example, the electromagnetically coupled region(s) can be formed of a sheet of conductive material, such as a two-dimensional sheet of conductive material. Additionally and/or alternatively, the electromagnetically coupled region(s) can be formed of wiring, traces, and/or other conductive material printed onto substrate 202. For instance, the electromagnetically coupled region(s) can be formed of conductive material that is integrated into and/or formed on substrate 202. (e.g., as opposed to components such as, for example, capacitors, inductors, etc.).

In some embodiments, the ground connection 220 including electromagnetically coupled region(s) can form a structure resembling an antenna shape, such as including a first end portion and/or a second end portion. The ground leg 212 of an antenna radiating element 210 can be coupled to the first end portion. Additionally and/or alternatively, the second end portion can be coupled to ground. For instance, in this manner, the ground connection 220 and/or electromagnetically coupled region(s) can be coupled to an antenna radiating element 210 to provide an increased electrical length.

As one example, the ground connection 220 including electromagnetically coupled region(s) can be or can include an isolated magnetic dipole shape. For instance, the isolated magnetic dipole shape can include at least one capacitively coupled region and/or inductively coupled region. The isolated magnetic dipole shape can be reflective of an isolated magnetic dipole antenna, such as an antenna that produces an isolated magnetic dipole when energized. For instance, in some embodiments, the isolated magnetic dipole shape can include a spiral planar portion to form the isolated magnetic dipole.

According to example aspects of the present disclosure, the antenna radiating element 210 can be configured to radiate at a radiating wavelength. For example, the radiating wavelength can be or can include one or more wavelengths at radiofrequency and/or any other suitable wavelengths. The ground connection 220 including electromagnetically coupled region(s) can be configured to provide a desirable electrical length based on the radiating wavelength. For instance, in some embodiments, the electromagnetically coupled region(s) can provide an electrical length of one quarter of the radiating wavelength at the ground leg 212. For instance, an electrical length of one quarter of the radiating wavelength can be beneficial for some antenna systems, such as monopole antenna systems. For instance, in some embodiments, the electrical length can be configured to mitigate a detuning condition of the antenna system. For example, the detuning condition can be any suitable detuning condition, such as detuning caused by a user's head, hand, or other body part, clothing, accessories, proximity to building, or any other suitable detuning condition. As another example, the electrical length of the ground leg 212 can be extended in reduced space, which can, in some cases, prevent additional spatial requirements associated with, for instance, matching circuitry, such as impedance matching circuitry.

Figure 3:
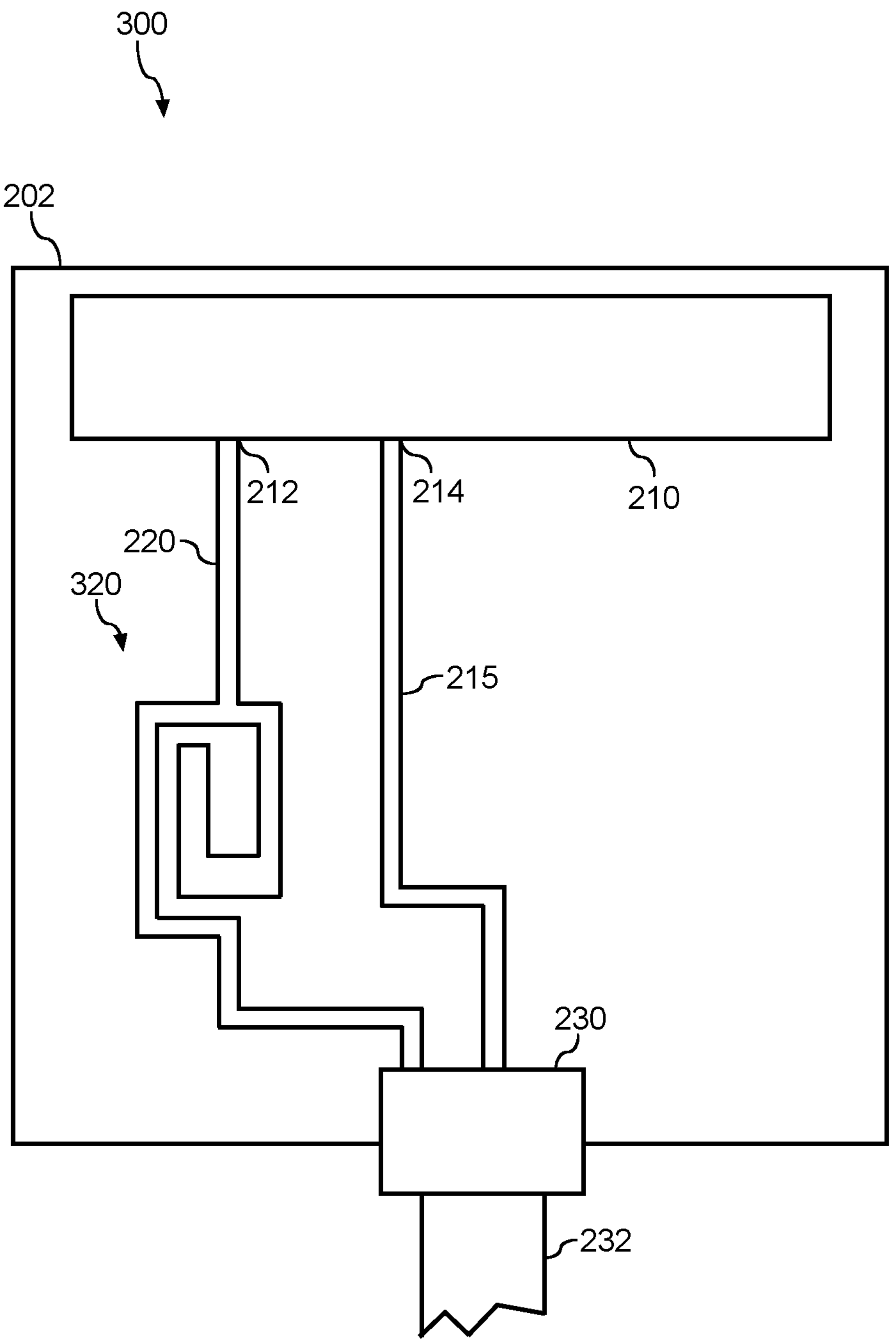
FIG. 3 illustrates an antenna system having a coupled region at a ground connection according to example embodiments of the present disclosure.

FIG. 3 illustrates an antenna system 300 having a coupled region at a ground connection according to example embodiments of the present disclosure. Antenna system 300 can include components discussed with reference to FIG. 2, such as, for example, antenna radiating element 210, connector 230, etc. Additionally, antenna system 300 can include isolated magnetic dipole shape 320 incorporated into ground connection 220. For instance, isolated magnetic dipole shape 320 can include one or more electromagnetically coupled regions. As one example, isolated magnetic dipole shape 320 can include a capacitively coupled region and an inductively coupled region. The isolated magnetic dipole shape 320 can be reflective of an isolated magnetic dipole antenna, such as an antenna that produces an isolated magnetic dipole when energized. For instance, in some embodiments, the isolated magnetic dipole shape 320 can include a spiral planar portion to form the isolated magnetic dipole.

Figure 4A:
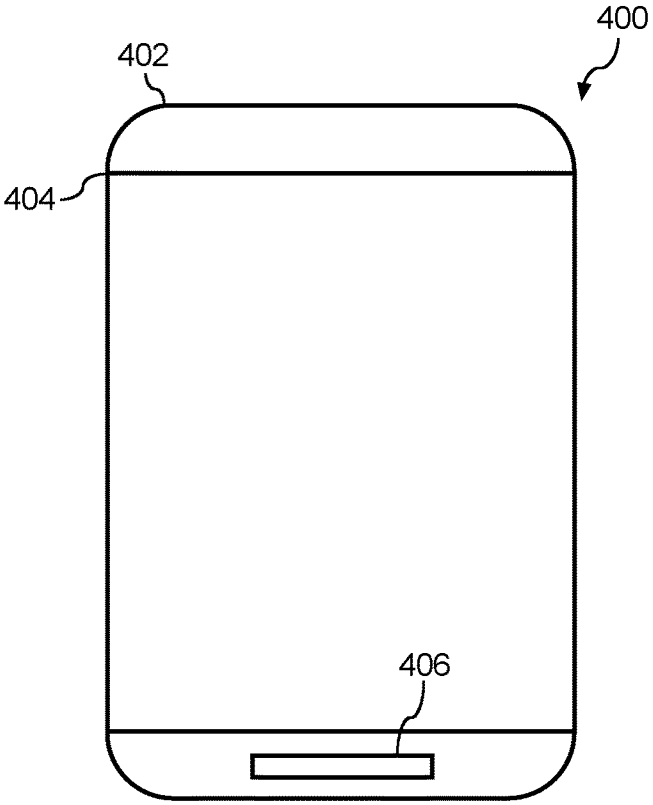
FIG. 4A illustrates a surface view of a mobile device having an antenna system with a coupled region at a ground connection according to example embodiments of the present disclosure.

FIG. 4A illustrates a surface view of a mobile device 400 having an antenna system with a coupled region at a ground connection according to example embodiments of the present disclosure. For instance, mobile device 400 can include housing 402. An antenna system according to example embodiments of the present disclosure (e.g., any one or more of antenna systems 100, 200, 300 of FIGS. 1-3 and/or any other suitable antenna system) can be included in housing 402.

Mobile device 400 can include display screen 404. Display screen 404 can be configured to display information from the mobile device 400 to a user of the mobile device 400. For instance, the display screen 404 can be or can include a LED screen, LCD screen, and/or any other suitable screen configured to display visual data to a user. Additionally and/or alternatively, display screen 404 can be configured to receive information from a user. For example, display screen 404 can include one or more touch-sensitive components (e.g., a touch screen, piezoelectric components, inductive components, etc.) configured to output control signals that control operation of the mobile device 400 in response to a touch from a user.

Mobile device 400 can include one or more user interactive components 406. For instance, user interactive components 406 can be or can include any suitable component configured to receive input from a user and/or provide output to a user (e.g., separately from and/or supplementary to display screen 404). As examples, user interactive components 406 can be or include buttons (e.g., power button, home button, volume control button, lock button, camera button, or any other suitable button, or combination thereof), lights (e.g., LEDs), speakers, microphones, switches, light sensors, cameras, and/or any other suitable user interactive components, and/or combination thereof. For instance, a user can interact with display screen 404 and/or user interactive components 406 to control operation of mobile device 400, such as to perform telecommunications via mobile device 400.

Figure 4B:
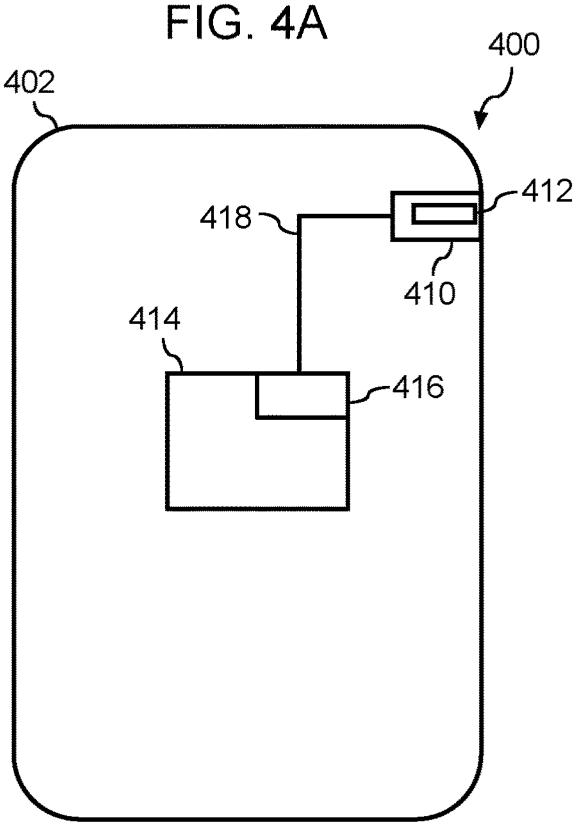
FIG. 4B illustrates an interior view of a mobile device having an antenna system with a coupled region at a ground connection according to example embodiments of the present disclosure.

FIG. 4B illustrates an interior view of mobile device 400 having an antenna system with a coupled region at a ground connection according to example embodiments of the present disclosure. For instance, FIG. 4B illustrates at least a subset of electronic components that can be configured to operate mobile device 400. Other components not illustrated in FIG. 4B, such as one or more sensors, processors, memory devices, etc. can be included in mobile device 400 in accordance with example aspects of the present disclosure.

Mobile device 400 can include antenna system 410. For instance, antenna system 410 can be disposed on a substrate that is included in (e.g., mounted to) housing 402. As examples, antenna system 410 can be or include any of antenna systems 100, 200, 300 discussed with reference to FIGS. 1-3, and/or any other suitable antenna system. For instance, antenna system 410 can include radiating element 412. Radiating element 412 can be configured to receive and/or transmit RF signals associated with operation of mobile device 400. In some embodiments, at least a portion of radiating element 412 can be mounted to or otherwise disposed on housing 402, such as additionally and/or alternatively to a substrate of antenna system 410. Although only one antenna system 410 is depicted in FIG. 4B, one of ordinary skill in the art should understand that any suitable number of antenna systems including any suitable number of radiating elements can be included in mobile device 400 in accordance with example aspects of the present disclosure.

Antenna system 410 (e.g., radiating element 412) can be coupled to processor 414. For instance, processor 414 can process some or all computations associated with operation of mobile device 400. As one example, processor 414 can be a central processing unit (CPU) of mobile device 400. For instance, processor 414 can include telecommunications circuitry 416 that is configured to receive and/or transmit signals to and/or from processor 414 associated with telecommunications functions of mobile device 400. For example, the signals associated with telecommunications functions can be or can include operations to transmit and/or receive data via antenna system 410.

For instance, antenna system 410 and processor 414 can be coupled by one or more transmission lines 418. As one example, transmission line(s) 418 can be or can include a coaxial cable having an inner conductor (e.g., a signal line) and an outer conductor (e.g., a ground layer and/or ground casing). The transmission line(s) 418 can be configured to transmit signals (e.g., RF signals) to operate antenna system 410 for telecommunications functions (e.g., RF communications). According to example aspects of the present disclosure, a second end portion of transmission line 418 (e.g., a ground layer) can be coupled to radiating element 412 by a ground connection having one or more electromagnetically coupled regions. Thus, antenna system 410 can achieve improved radiation characteristics associated with an increased ground connection electrical length. As another example, antenna system 410 can achieve a suitable ground connection electrical length (e.g., a quarter wavelength electrical length) while occupying a comparatively smaller footprint in housing 402. Thus, spatial considerations of housing 402 can be better accommodated by antenna system 410 according to example aspects of the present disclosure.

As used herein, “about” in conjunction with a stated numerical value is intended to refer to within 20% of the stated numerical value.

While the present subject matter has been described in detail with respect to specific example embodiments thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An antenna system comprising:

an antenna radiating element configured for at least one of RF signal transmission or RF signal reception, the antenna radiating element comprising a ground leg and a feed leg;

a connector coupled to a transmission line, the transmission line comprising an inner conductor and an outer conductor;

a feed connection coupled to the feed leg and configured to couple the feed leg to RF circuitry via the connector; and a ground connection coupled to the ground leg and configured to couple the ground leg to ground via the connector, the ground connection including one or more electromagnetically coupled regions comprising a spiral planar portion;

wherein:

the feed connection is coupled to the inner conductor of the transmission line via the connector;

the ground leg is electrically coupled to a portion of an outer ring of the spiral planar portion and the ground connection is coupled to the outer conductor of the transmission line via the connector; and the one or more electromagnetically coupled regions are configured to increase an electrical length of the ground connection relative to a conductor length of the ground connection; and wherein the antenna radiating element is configured to radiate at a radiating wavelength and wherein the one or more electromagnetically coupled regions are configured to provide the electrical length of the ground connection as one quarter of the radiating wavelength at the ground leg.

2. The antenna system of claim 1, wherein the one or more electromagnetically coupled regions comprise at least one of one or more capacitively electromagnetically coupled regions or one or more inductively electromagnetically coupled regions.

3. The antenna system of claim 1, wherein the one or more electromagnetically coupled regions comprise an isolated magnetic dipole shape.

4. The antenna system of claim 1, wherein the ground connection comprises a first end portion and a second end portion, wherein the ground leg is coupled to the first end portion and the second end portion is coupled to ground.

5. The antenna system of claim 1, wherein the RF circuitry is configured to operate the antenna radiating element for the at least one of RF signal transmission or RF signal reception.

6. The antenna system of claim 1, wherein the antenna radiating element, the one or more electromagnetically coupled regions, and the ground connection are disposed on a substrate.

7. The antenna system of claim 6, wherein the substrate comprises a planar substrate.

8. The antenna system of claim 6, wherein the one or more electromagnetically coupled regions comprise one or more traces on the substrate.

9. The antenna system of claim 1, wherein the antenna system is positioned in a mobile device.

10. The antenna system of claim 1, wherein the one or more electromagnetically coupled regions are configured to filter one or more frequencies.

11. The antenna system of claim 1, wherein the electrical length is configured to mitigate a detuning condition of the antenna system.

12. The antenna system of claim 1, wherein the antenna radiating element comprises a planar antenna.

13. The antenna system of claim 1, wherein the antenna radiating element comprises a planar inverted F antenna.

14. The antenna system of claim 1, wherein the antenna radiating element comprises a monopole antenna.

15. The antenna system of claim 1, wherein the antenna radiating element comprises an isolated magnetic dipole antenna.

16. The antenna system of claim 1, herein the transmission line comprises a coaxial cable.

17. A mobile device comprising:

one or more processors;

telecommunication circuitry configured to provide telecommunications; and an antenna system coupled to the telecommunication circuitry, the antenna system comprising:

an antenna radiating element configured for at least one of RF signal transmission or RF signal reception, the antenna radiating element comprising a ground leg and a feed leg;

a connector coupled to a transmission line, the transmission line comprising an inner conductor and an outer conductor;

a feed connection coupled to the feed leg and configured to couple the feed leg to RF circuitry via the connector; and a ground connection coupled to the ground leg and configured to couple the ground leg to ground via the connector, the ground connection including one or more electromagnetically coupled regions comprising a spiral planar portion;

wherein the ground leg is electrically coupled to a portion of an outer ring of the spiral planar portion;

wherein the feed connection is coupled to the inner conductor of the transmission line via the connector and the ground connection is coupled to the outer conductor of the transmission line via the connector, and wherein the one or more electromagnetically coupled regions are configured to increase an electrical length of the ground connection; and wherein the antenna radiating element is configured to radiate at a radiating wavelength and wherein the one or more electromagnetically coupled regions are configured to provide the electrical length of the ground connection as one quarter of the radiating wavelength at the ground leg.

18. The mobile device of claim 17, wherein the one or more electromagnetically coupled regions comprise at least one of one or more capacitively electromagnetically coupled regions or one or more inductively electromagnetically coupled regions.

* * * * *